Aug. 31, 1965  R. L. RENFROE ETAL  3,203,360
TROLLEY
Filed Aug. 16, 1963  3 Sheets-Sheet 1

INVENTORS
Raymond L. Renfroe
Robert C. Renfroe

BY
Irons, Birch, Swindler & McKie
ATTORNEYS

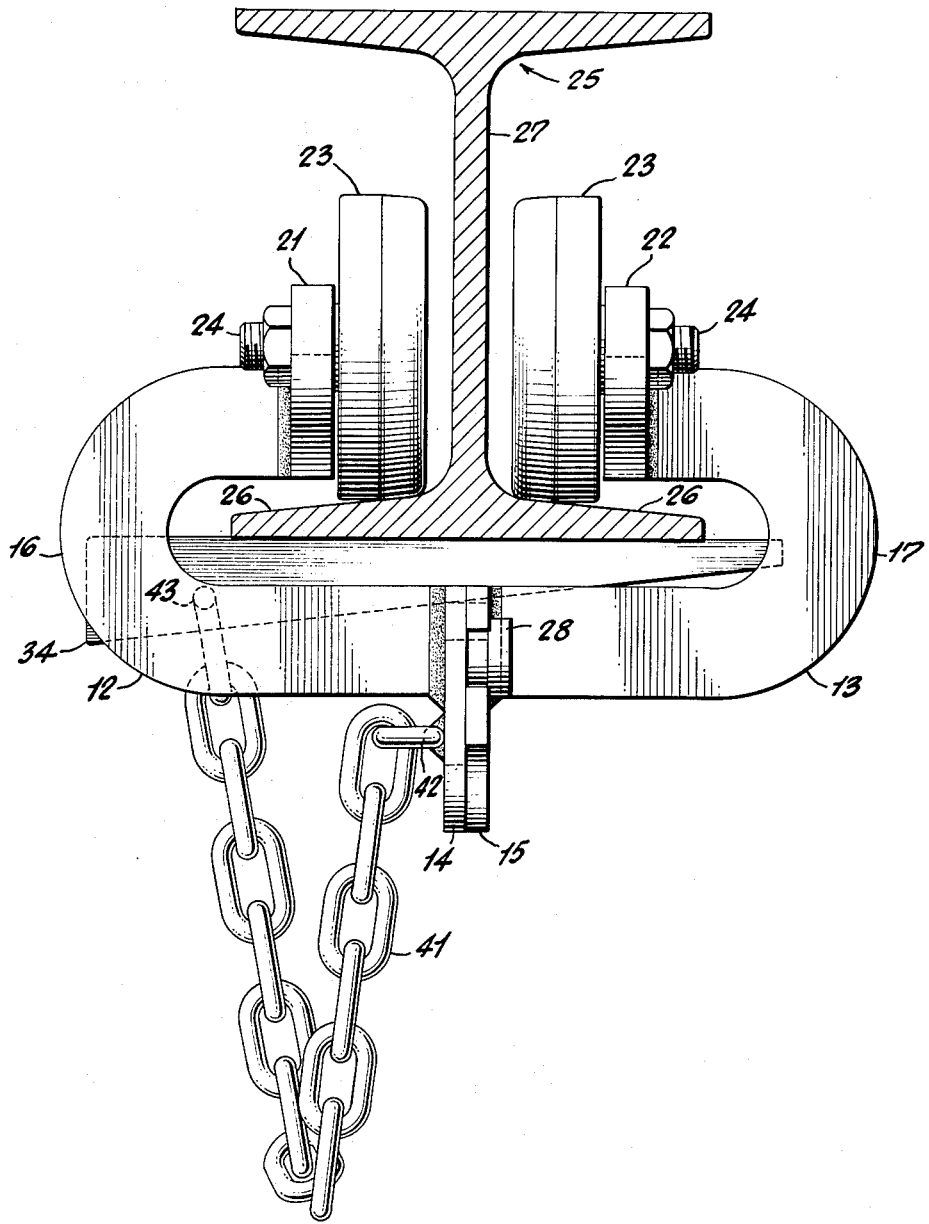

Aug. 31, 1965  R. L. RENFROE ETAL  3,203,360
TROLLEY
Filed Aug. 16, 1963  3 Sheets-Sheet 3
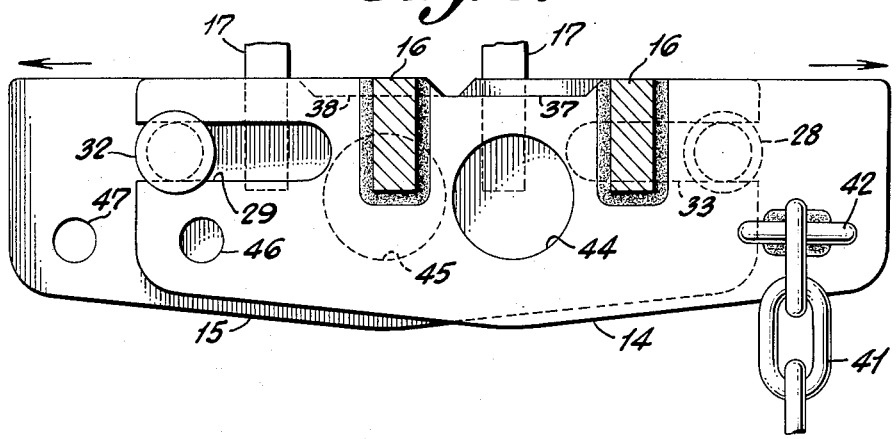
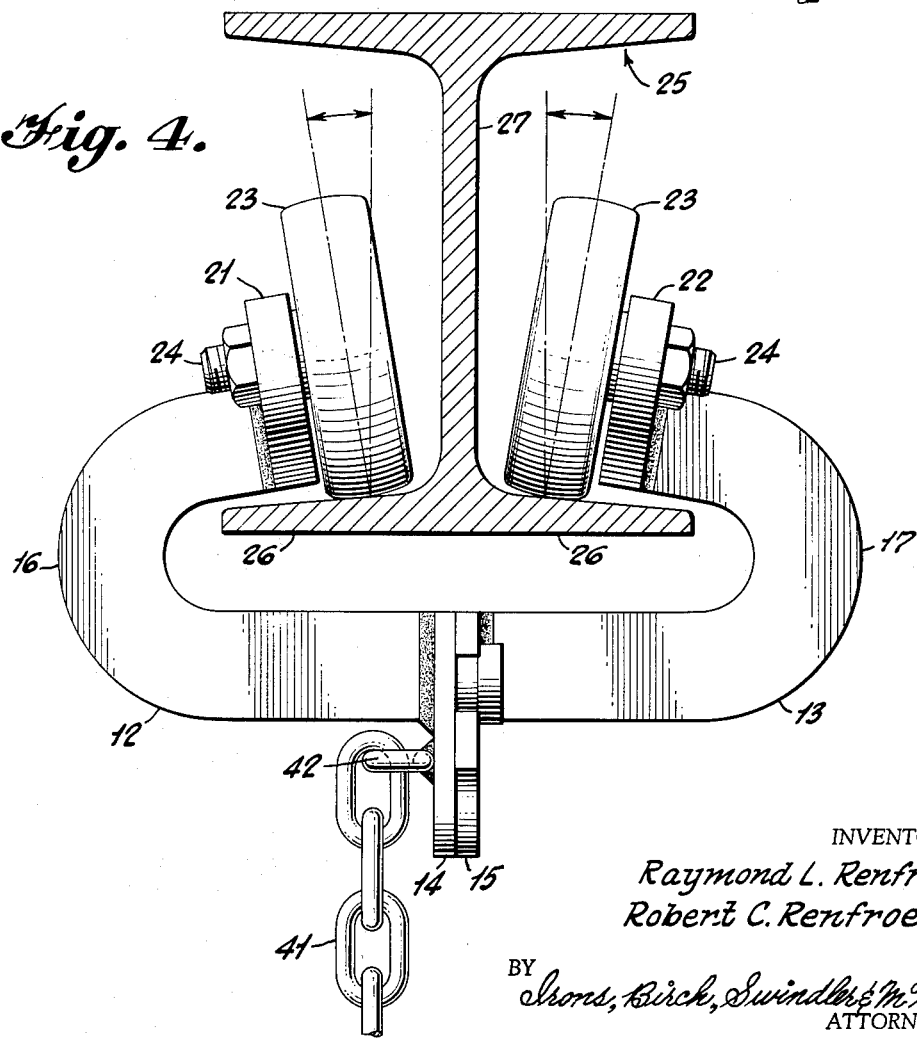
INVENTORS
Raymond L. Renfroe
Robert C. Renfroe
BY
Irons, Birch, Swindler & McKie
ATTORNEYS

3,203,360
TROLLEY
Raymond L. Renfroe and Robert C. Renfroe, both of 1926 Spearing St., Jacksonville, Fla.
Filed Aug. 16, 1963, Ser. No. 302,672
1 Claim. (Cl. 105—154)

This invention relates to trolleys which may be moved along the flanges of a supporting member such as an I-beam and anchored in a fixed operative position any place along the supporting member.

Beam clamps of various types have been widely used for many years for supporting a load suspended from the beam. Such clamps are often heavy and difficult to adjust to different positions on the beam especially under load. Indeed, many of such clamps must be dismantled and removed from the beam in order to change their location. This precedure is not only time consuming but dangerous to personnel and equipment on the floor below. Further, certain of the prior art beam clamps are comprised of at least two separable components which can become disconnected and separated while actually supporting a load.

To overcome the disadvantages of the prior art beam clamps, it is an object of the present invention to provide an improved beam clamp having means to preclude separation of the two halves of the clamp as long as a load is supported by the clamp.

Another object of the invention is to provide such a clamp which is readily movable along the flanges of a supporting member or beam.

A further object of the invention is to provide an improved beam clamp which is readily movable along the beam but yet may be conveniently secured in a fixed operative position at any point along the beam with a minimum of effort.

A still further object of the invention is to provide such a clamp having a simple construction which may be readily detached from a beam, and is easy to handle.

The invention generally relates to a beam clamp comprising a pair of interlocking clamping members, each clamping member having a side plate and hook means rigidly secured to said side plate, wheel means carried by said hook means, means for releasably connecting said clamping members together in face to face relationship in clamping position on the flanges of a supporting member so that said wheel means engage the upper sides of said flanges, said wheel means permitting said clamping members to be readily moved along said flanges when said clamping members are connected together, means for securing said members in a fixed operative position on said flanges, and load supporting means defining an aperture in each of said clamping members, said apertures being in at least partial alignment when said clamping members are connected together in clamping position to permit a load carrying member to pass therethrough, said apertures additionally being of a predetermined size in correlation with said connecting means to preclude separation of said clamping members so long as any portion of said apertures remain in alignment.

The invention having been broadly described, a preferred specific embodiment will now be discussed in detail with reference to the accompanying drawings in which:

FIGURE 2 is an end view of the clamp with the supporting I-beam shown in section;

FIGURE 3 is an enlarged side elevational view of a portion of the clamp showing the manner in which the side plates of the clamp are separated from interlocking relationship by relative longitudinal movement of the plates away from each other; and FIGURE 4 is an end view of a modified form of the clamp having angularly tilted wheels.

Figure 1:
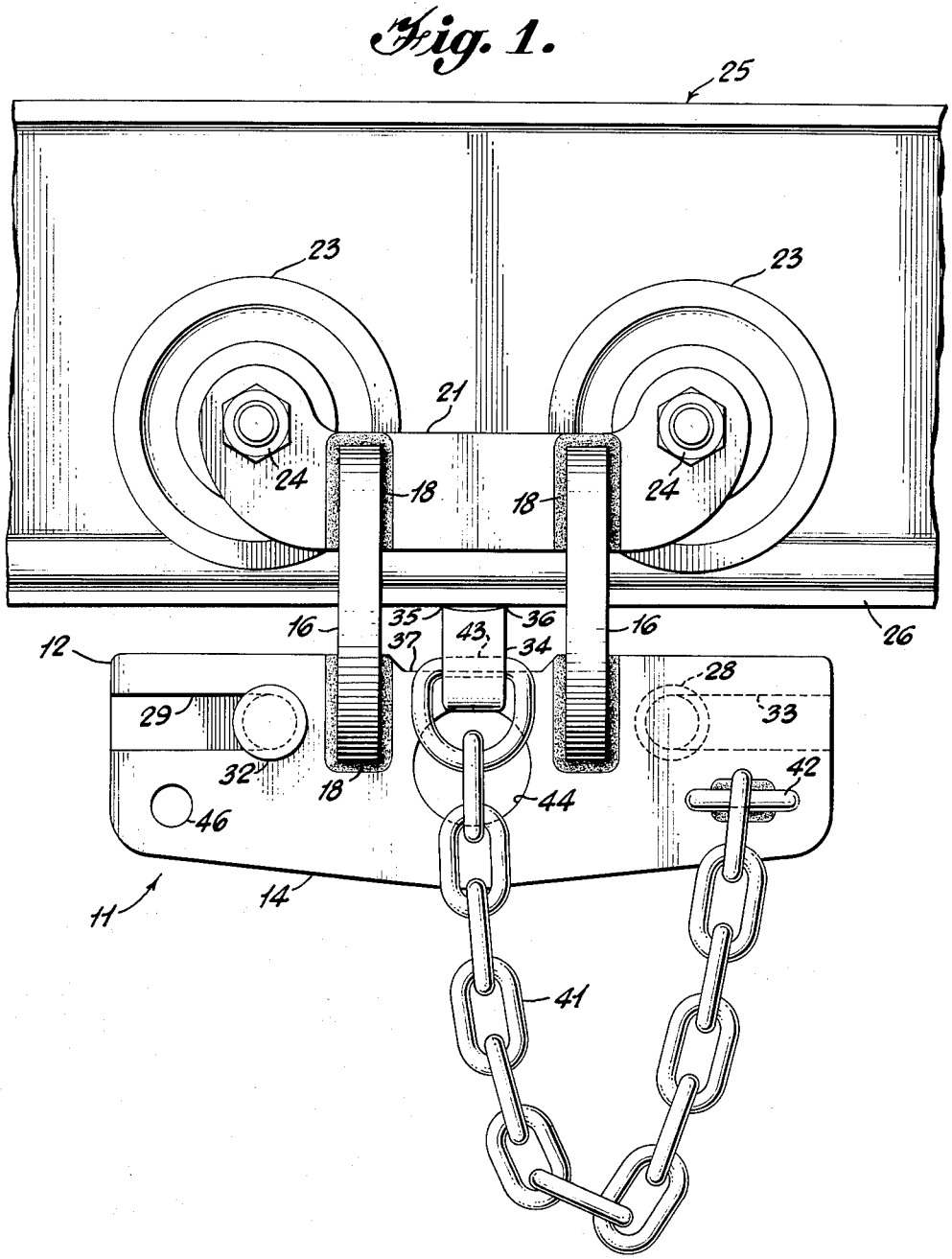
FIGURE 1 is a side elevational view of a beam clamp according to the present invention showing the clamp locked in a fixed operative position on the lower flange of an I-beam.

Illustrated in the drawings is a clamp generally referred to by the reference numeral 11. The clamp includes a pair of clamping members 12 and 13 adapted to be releasably connected together in face to face relationship. Clamping members 12 and 13 are comprised of side plates 14 and 15, having hook means or members 16 and 17, respectively, rigidly secured thereto, as by welding 18. Although a pair of spaced hook members are shown for each clamping member, a greater or lesser number of hook members may be employed.

Rigidly secured to the upper end of the hook members 16 and 17 are wheel means comprising elongated supporting cross bars 21 and 22, respectively, having upturned ends thereon to support the wheels 23. The wheels are attached to the upturned ends of cross bars 23 by means of nut and bolt assemblies 24 extending through the wheels and apertures provided in the upturned ends of the cross bars.

The clamp 11 is particularly designed for use with an I-beam 25 having lower flanges 26, although it may be used with other beam type supporting members such as H-beams, wide flanged beams and the like. As best shown in FIGURES 2 and 4, the flanges 26 of the typical I-beam increase in thickness as they approach the central connecting web 27, thus giving a slope to the flanges. The wheels 23 preferably have tapered or rounded inside edges to enable them to compensate for the variations in the slope or curvature of the flanges 26 so that they remain firmly in contact with the flanges at all times while the clamp is mounted thereon.

When the clamp 11 is mounted on the I-beam 25, the wheels 23 engage the thicker or stronger portions of the flanges 26 on the upper sides thereof. The wheels 23 permit the clamp 11 to be readily moved along the I-beam with a minimum of effort.

Suitable means are provided for releasably connecting the clamping members 12 and 13 together in interlocking face to face relationship in clamping position on the flanges 26 of the supporting member or I-beam 25. The particular connecting means shown in the drawings comprises a headed stud 28 adjacent one end of side plate 14 on its inside face and a slot 29 extending inwardly from the opposite end thereof and a headed stud 32 adjacent one end of side plate 15 on its inside face and a slot 33 extending inwardly from the opposite end thereof. It will be noted that the two side plates 14 and 15 are so constructed that the headed stud 28 is toward the right end of plate 14 and the slot 29 is toward the left end thereof while the headed stud 32 is toward the left end of plate 15 and the slot 33 is toward the right end thereof, as shown in FIGURES 1 and 3. The plates 14 and 15, and consequently clamping members 12 and 13, may be joined together in interlocking relationship by relative sliding movement towards each other in directions parallel to the flanges of the supporting I-beam so that the stud of each side plate engages the slot of the other side plate. The clamping members 12 and 13 may be separated or detached from each other by the same relative sliding movements in the opposite direction away from each other.

Clamping members 12 and 13 are joined together in face to face relationship in clamping position on the flanges 26 of the supporting member or I-beam so that the wheels 23 are situated above and in engagement with the upper surfaces of the flanges and the side plates 14 and 15 are situated at a spaced distance below the opposite lower surfaces of the flanges in interlocking relationship as shown in FIGURES 1 and 3. Cam means comprising a wedge 34 mutually engageable with the flanges 26 and the side plates 14 and 15 of the clamping members 12 and 13 serves to lock or secure the clamping members in a fixed operative position on the flanges. Wedge 34 is preferably constructed with a concave upper surface having cutting edges 35 and 36 as shown in FIGURE 1. To lock the clamping members in a fixed operative position, the wedge 34 is inserted into the space formed between the side plates and the flanges so that the cutting edges 35 and 36 engage the lower sides of the flanges. It is to be noted that the side plates 14 and 15 are provided with recesses 37 and 38, respectively, on their upper edges centrally of the plates. Recesses 37 and 38 serve as seating surfaces for the bottom face of wedge 34.

Wedge 34 is attached to side plate 14 by any suitable flexible connecting member such as chain 41. The chain 41 is attached at one end to an eyelet 42 rigidly mounted at one end of plate 14 of clamping member 12 while the opposite end of chain 41 engages an aperture 43 in one end of wedge 34.

The clamping members are provided with load supporting means defining apertures 44 and 45 located intermediate or centrally of the pairs of spaced hook members of plates 14 and 15, respectively. A chain fall or other load carrying member may be supported in the load supporting apertures 44 and 45. The apertures must be in at least partial alignment to permit the load carrying member to pass therethrough when the clamping members 12 and 13 are connected together in clamping position. Moreover, the apertures 44 and 45 are of a sufficiently predetermined size in correlation with the connecting means previously described to preclude separation of the clamping members so long as any portion of the two apertures remain in alignment. Thus, it is evident that the insertion of any load carrying member, however slim, through the two apertures would prevent separation of the clamping members. This is a particularly advantageous safety feature of the present invention in that there is no danger of the clamp becoming detached or separated from its I-beam or other supporting member as long as a load is supported by the load supporting means of the clamp.

The clamping members may be provided with an additional load supporting means such as apertures 46 and 47 located adjacent the ends of side plates 14 and 15, respectively, as shown in FIGURES 1 and 3. The apertures 46 and 47 are particularly useful for applying a load at the ends of the clamping members thus creating a tendency in the clamping members to rotate. Such tendency to rotate is effective in preventing slippage of the clamp along the I-beam in that the rotation more efficiently locks the wedge 34 in place.

The clamp is constructed to accommodate various thicknesses and widths of beam flanges. As shown in FIGURE 2, the vertical spacing between the wheels 23 and the clamping members is sufficient to accommodate very thick flanges. Thinner flanges are clamped tightly by increased penetration of the wedge 34. Moreover, the horizontal spacing between the arcuate portions of the hook members 16 and 17 is sufficient to accommodate very wide flanges.

The wheels 23 are horizontally spaced apart a relatively small distance to rest on the flange near the beam web. Thus, the flange bears the load at its strongest points. Placement of the bearing points near the outer edge of the flange greatly increases the chance of bending the flange.

The side plates 14 and 15 are located in a vertical plane midway between the wheels 23. Thus, the load bearing surface at the bottom of the openings 44 is vertically aligned with the center of the beam web, thus enabling a balanced loading of the beam at its strongest point.

A modified form of the invention is shown in FIGURE 4 in which the wheels 23 are angularly tilted with respect to a vertical line taken through the center of the clamp. Although the wheels may be tilted to any desired angle, the preferred angle of tilt varies from 3° to 10° as shown by the arrows in FIGURE 4. The tilted wheels allow for better centering of the clamp at all times, particularly when traveling around a curved beam or tramrail. In addition, there is less chance of the wheels contacting the web of the supporting beam, thus avoiding any excessive friction when the clamp is moved along the beam. In other respects the modified clamp is identical to that previously described.

While the invention has been described with particular reference to two specific preferred embodiments, many other modifications may be made by persons skilled in the art without departing from the scope of the invention which is defined solely by the appended claim.

We claim:

A trolley comprising a pair of clamping members, each of said clamping members having a side plate and hook means rigidly secured to said side plate, a pair of wheels carried by each of said hook means, said wheels being spaced apart longitudinally of said side plates, means for releasably connecting said clamping members together in face to face relationship in clamping position on the flanges of a supporting member so that said wheel engage the upper surfaces of said flanges, said connecting means including a bayonet stud fixed to one of said members and a slot in the other of said members, said stud being slidably engageable in interlocked relation with said slot over a first length, said wheels permitting said clamping members to be moved along said flanges when said clamping members are connected together, means for securing said members against movement along said flanges, and load supporting means defining an aperture through each of said clamping members, said apertures being overlapped with each other over a second length when said stud and slot are fully engaged to define an opening extending through both of said side plates to receive a load carrying member, said opening being centered between said spaced wheels to distribute evenly between said wheels the load carried by said load supporting means, said first length being greater than said second length so that relative sliding movement of said side plates will remove the overlap between said apertures and thus close said opening before disengaging said stud from said slot to preclude separation of said clamping members when any object extends through said opening.

References Cited by the Examiner

UNITED STATES PATENTS

| 979,028 | 12/10 | Olson | 104—110 |
| 1,867,883 | 7/32 | Haddlesay | 104—108 |
| 2,583,833 | 1/52 | Graf | 105—154 |
| 2,645,187 | 7/53 | Gadagna | 105—154 |
| 2,791,461 | 5/57 | Goldenberg | 294—85 |
| 2,916,244 | 12/59 | Renfroe | 105—154 |
| 3,065,715 | 11/62 | Mackniesh | 105—154 |

FOREIGN PATENTS 41,240   4/25   Norway.

EUGENE G. BOTZ, *Primary Examiner.*

ARTHUR L. LA POINT, *Examiner.*